United States Patent [19]
Barber

[11] 3,952,168
[45] Apr. 20, 1976

[54] ROTARY TELEPHONE DIAL STRUCTURE
[75] Inventor: Eugene Barber, Corinth, Miss.
[73] Assignee: International Telephone and Telegraph Corporation, New York, N.Y.
[22] Filed: July 1, 1974
[21] Appl. No.: 484,971

[52] U.S. Cl. ............................................. 179/90 R
[51] Int. Cl.² ........................................ H04M 1/23
[58] Field of Search .......... 179/90 R, 90 A, 90 FW; 240/2.17

[56] References Cited
UNITED STATES PATENTS

| | | | |
|---|---|---|---|
| 2,963,554 | 12/1960 | Hershey | 179/90 R |
| 3,105,122 | 9/1963 | Babb et al. | 179/90 R |
| 3,210,480 | 10/1965 | Hartz | 179/90 FW |
| 3,525,821 | 8/1970 | Pulles | 179/90 R |
| 3,851,113 | 11/1974 | Blackmon, Jr. | 179/90 FW |

Primary Examiner—Kathleen H. Claffy
Assistant Examiner—Gerald L. Brigance
Attorney, Agent, or Firm—James B. Raden; Marvin M. Chaban

[57] ABSTRACT

Disclosed is a rotary dial with improved mounting arrangements for assembling the dial and for securing the dial within a telephone instrument. A rotary dial using the present construction features allows one common dial base to be mounted in a number of different housing configurations. The common dial base is fabricated of molded high impact plastic into which mounting members using the present design may be snap-fitted. By providing snap-in mounting members in a plurality of slightly different configurations, the same dial may fit within a plurality of dial housings. As a further part of the improved mounting structure, an easily mountable locking ring is employed to cooperate with the dial base and snap lock a number ring firmly in place.

10 Claims, 15 Drawing Figures

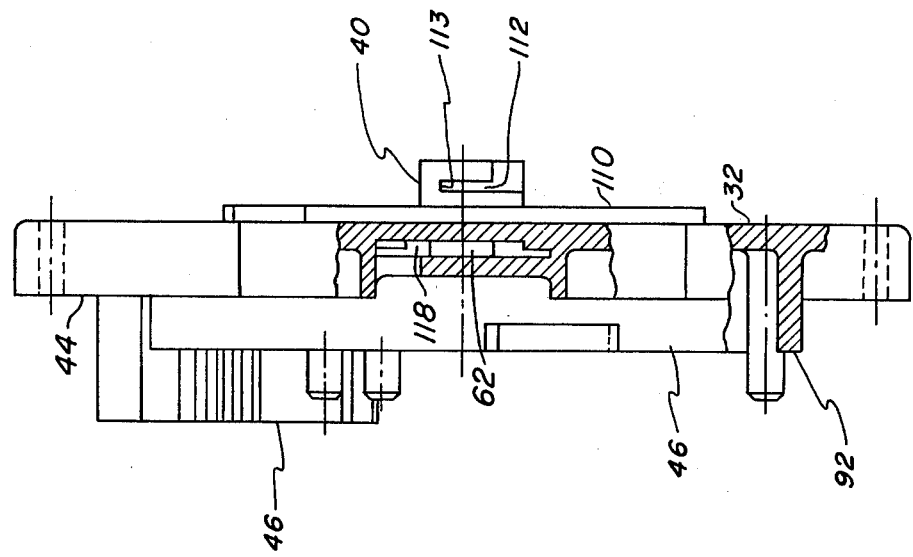
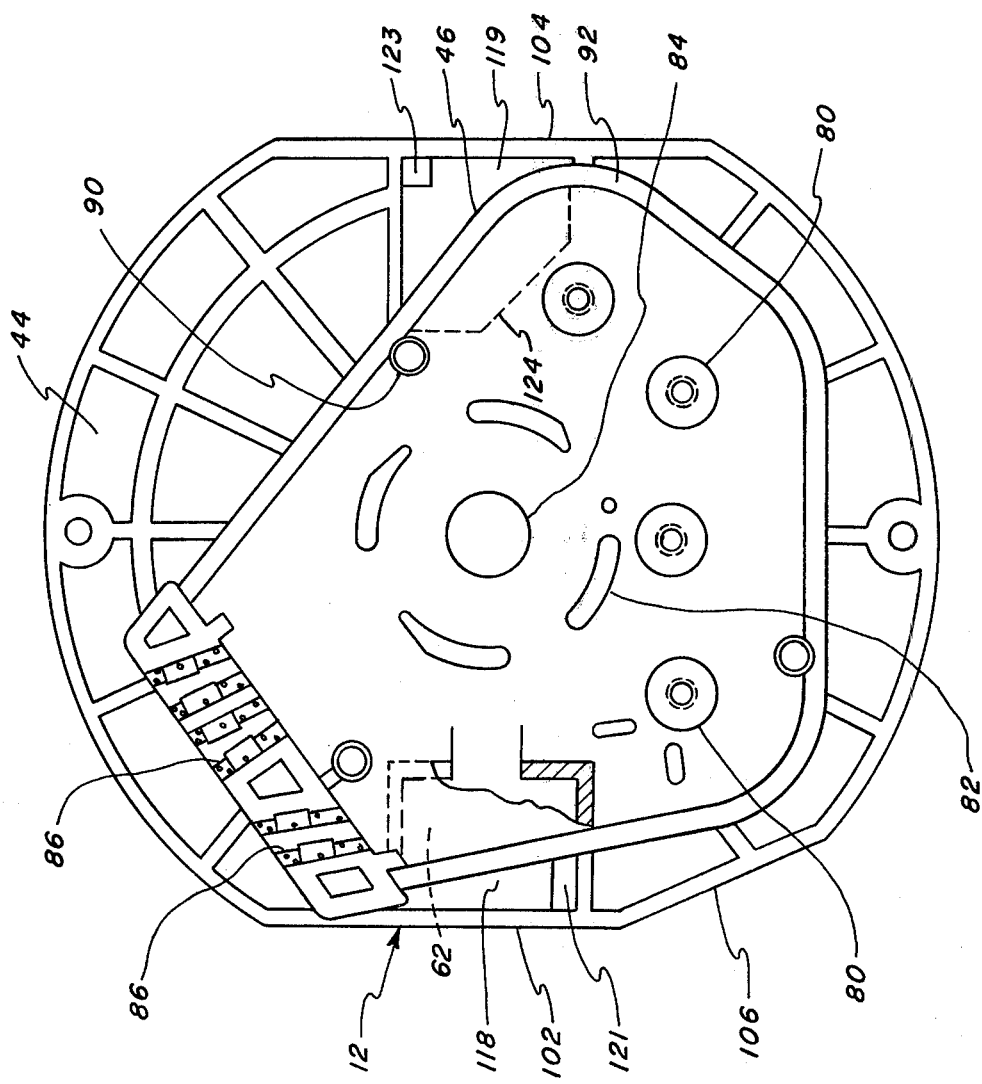

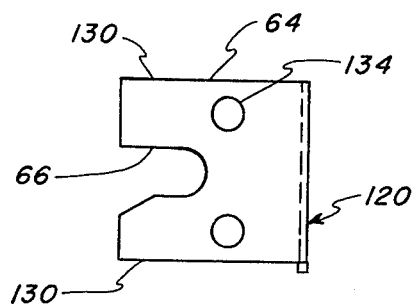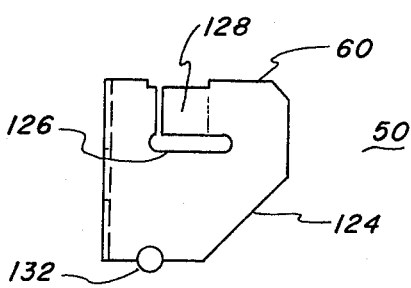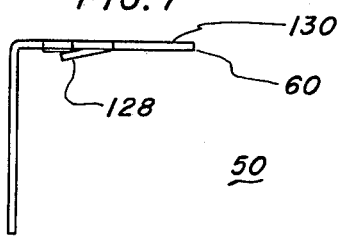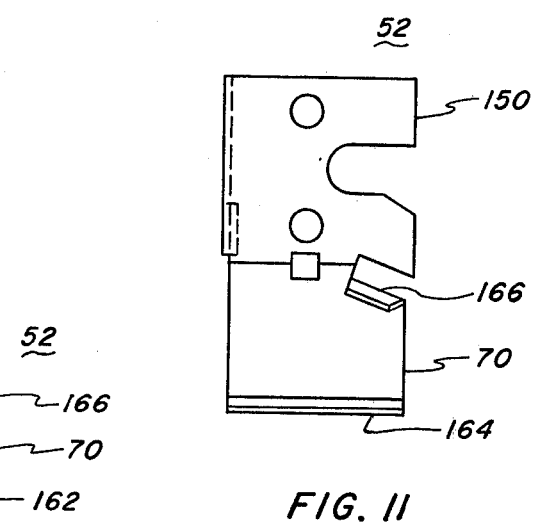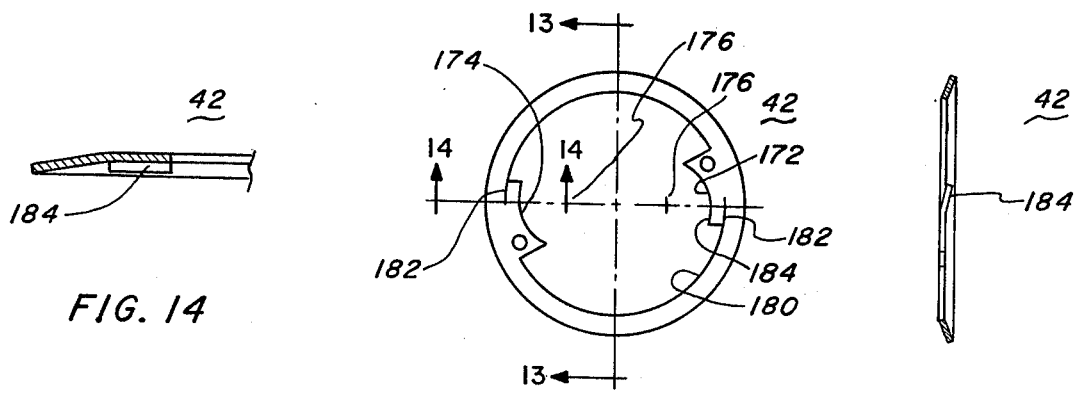

ROTARY TELEPHONE DIAL STRUCTURE

BACKGROUND OF THE INVENTION

This invention is directed to improved structure for a telephone rotary dial apparatus. A rotary dial as is well-known provides control of the call direction in telephone systems. As such, the dial is mounted in a telephone station instrument and provides a visual annular number plate and finger wheel in a well-known manner. The rotatable finger wheel is affixed to the operative mechanism through the center of the dial, the operative mechanism being disposed on the rear of a dial mounting base for outpulsing in response to the rotary movement of the finger wheel.

Most dial bases have been manufactured of stamped and plated steel with the operative components mounted by screws or rivets to the base and with portions of the metal base suitably formed or bent at various angles to produce the desired functions. Twin metal plates are frequently necessary to provide the plural mounting members necessary. Recently, dial bases have been fabricated of molded high impact plastics such as that sold under the trade name "Lexan." With such plastic dial bases, some of the mounting members may be molded into the base. The base receives the operative mechanism and the face or number plate. The number or indicia plate which may include a single integral ring or plural rings should be readily capable of mounting on the dial base in a predetermined angular position relative to the operative mechanism and should be able to be readily secured in this position. Frequently this mounting is performed through the use of screw receiving embosses mating with an opening for suitable screw fastenings.

In any such dial, certain basic requirements must be met. For example, the number plate must be stationary relative to the base and operative mechanism. A finger wheel should be mounted on the exterior of the number plate, the finger wheel being rotatable under manual control. The finger wheel must be connected to the operative dial mechanism within a central opening in the dial base, the mechanism being mounted on the back side of the base. With the dial fully assembled, the dial must then be capable of being secured within the necessary telephone instrument housing.

Of the more recent dials using a molded plastic dial base, an exemplary one is shown in the article by C. Ciborra on Page 56 of "Electrical Communication" (Technical Journal published by International Telephone and Telegraph Corporation), Vol. 46 (1971) Number 1.

In the dial shown by that article, molded bosses and threaded receivers provide for mounting the various components and assemblies to the dial base.

SUMMARY OF THE INVENTION

The present invention provides an improved rotary dial assembly using many of the basic construction features shown by the cited article, such as a molded plastic dial base. The present assembly reduces the number of screw and threaded receiver connections used in the prior assembly and thereby facilitates the assembly process by the use of snap-in component parts. These snap-in parts mate with the plastic dial base to complete the assembly in a simple and inexpensive manner.

Further, the invention provides apparatus for accommodating a common dial base for a number of assemblies of different configuration, the differences being compensated for by inserting brackets of different dimension but all using the present features. The dial assembly so produced may be interchangeable to replace presently available dials.

The dial base usable herein comprises a generally circular plate of molded high impact plastic. Through a central, concentric opening in the plate, the exposed appearance members are mounted to one face of the plate and internal operative members are mounted to the back face of the dial base. To the back face of the dial are fitted snapin, strip steel mounting brackets which are used to assemble the dial base to the station instrument housing. One of these brackets also includes a mounting structure for a standard finger stop.

To join the front member or indicia plate firmly to the dial base, the dial base is molded with two outwardly extending pillar elements within a collar which serves to position and space the number plate relative to the base. These pillar members each have a transverse recess intermediate along the pillar height on the pillar outer side. A crowned ring member rides on the dial number plate and has inward extensions which engage the pillar recesses to firmly lock the number plate to the dial base.

It is therefore an object of the invention to provide an improved dial base assembly for use in rotary dial telephones.

It is a further object of the invention to provide a plastic dial base which accepts snap-in spring members to both mount the dial base to a housing and to secure the face number plate to the dial base.

It is a still further object of the invention to provide an improved mounting structure for joining a number plate to a dial base through the use of mounting extensions or lugs on the inner circumference of a crowned, spring retaining ring, the lugs being partially split angularly at the joinder to the ring, to engage and lock within holding members on the base.

These and other objects, features and advantages of the invention will become apparent from the specification viewed in conjunction with the drawings described briefly next.

BRIEF DESCRIPTION OF THE DRAWINGS

FIG. 3 is a view in elevation of the rear face of the dial base of FIG. 1;

FIG. 4 is a side view in elevation of the dial base of FIG. 3;

FIGS. 6, 7 and 8 are respective elevational views of one bracket of FIG. 2;

FIGS. 9, 10 and 11 are respective elevational views of the second bracket of FIG. 2;

FIGS. 12 and 13 are respective elevational views of the retaining ring of FIG. 1;

FIG. 14 is a sectional view taken along line 14—14 of FIG. 12; and

DETAILED DESCRIPTION OF THE DRAWINGS

Figure 1:
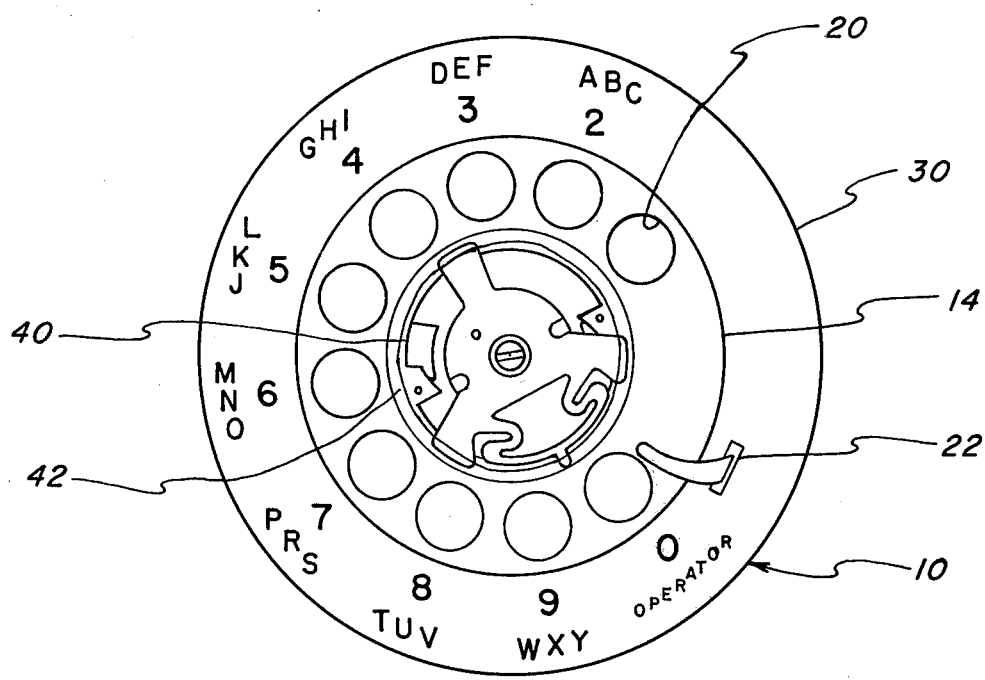
FIG. 1 is a front perspective view of a dial using my invention, a portion of the face of the dial being broken away to show the interior thereof.
Figure 2:
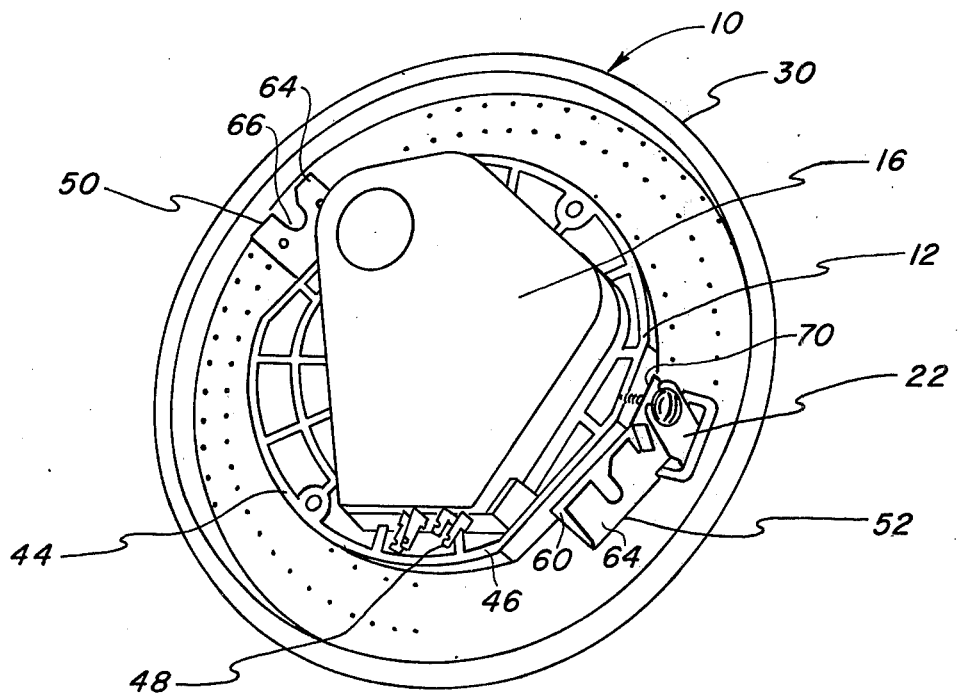
FIG. 2 is a rear perspective view of the dial base assembly herein.

In FIG. 1, I show a fully assembled rotary dial 10 as used in telephony, the general construction of which is well-known in the art. The dial 10 of FIGS. 1 and 2 is similar to that shown and described in an article by C. Ciborra in "Electrical Communication" magazine on pages 56–59 of Volume 46, No. 1 of 1971. This dial comprised an improvement over the then-known art by providing a dial base of high impact plastic such as that sold under the trademark "Lexan." Most earlier dials used a sheet steel dial base with holes and slots stamped through it to receive screws and rivets, and with angled sections to hold the components of the dial assembly.

The dial 10 of FIGS. 1 and 2 has an annular dial base 12 with a central circular opening through which connection is made between the rotatable finger wheel 14 and the operative dial mechanism of any known type, within the closed dust cover 16 of FIG. 2. The finger wheel may be metal or plastic, clear plastic being shown herein, and has an annular set of circular openings 20 each sized to receive the finger or dialing implement of the dial user. As is known, a stationary finger stop 22 is mounted to the dial base and extends over the finger wheel to provide a stationary movement stop for manual rotation of the dial, as is generally known.

Axially, below the finger wheel is a stationary number or indicia plate 30. Plate 30, as is shown, may have numbers or markings under the openings 20. Alternative known forms of indicia plates (not shown) have letters and numbers radially outward of the respective finger wheel openings with a control dot or letter combination beneath each wheel opening.

The stationary indicia plate is mounted flat against the front face 32 (FIG. 3) of the dial base. In one known design, the indicia plate is mounted to the dial base by screws extending through suitable openings in the dial base and bottoming into threaded bosses on the inside face of the indicia plate. In another known dial, three hook-shaped fingers extend axially in an annular alignment about the inner periphery of the base plate. These fingers may be integral extensions of the base. A retainer ring of spring steel with inwardly directed segments mates with these fingers. The ring rests overlappingly on the indicia plate and locks to the fingers to hold the indicia plate to the base plate. The ring segments have an inner edge which is on the circumference of a circle centered at the ring and dial center.

Figure 5:
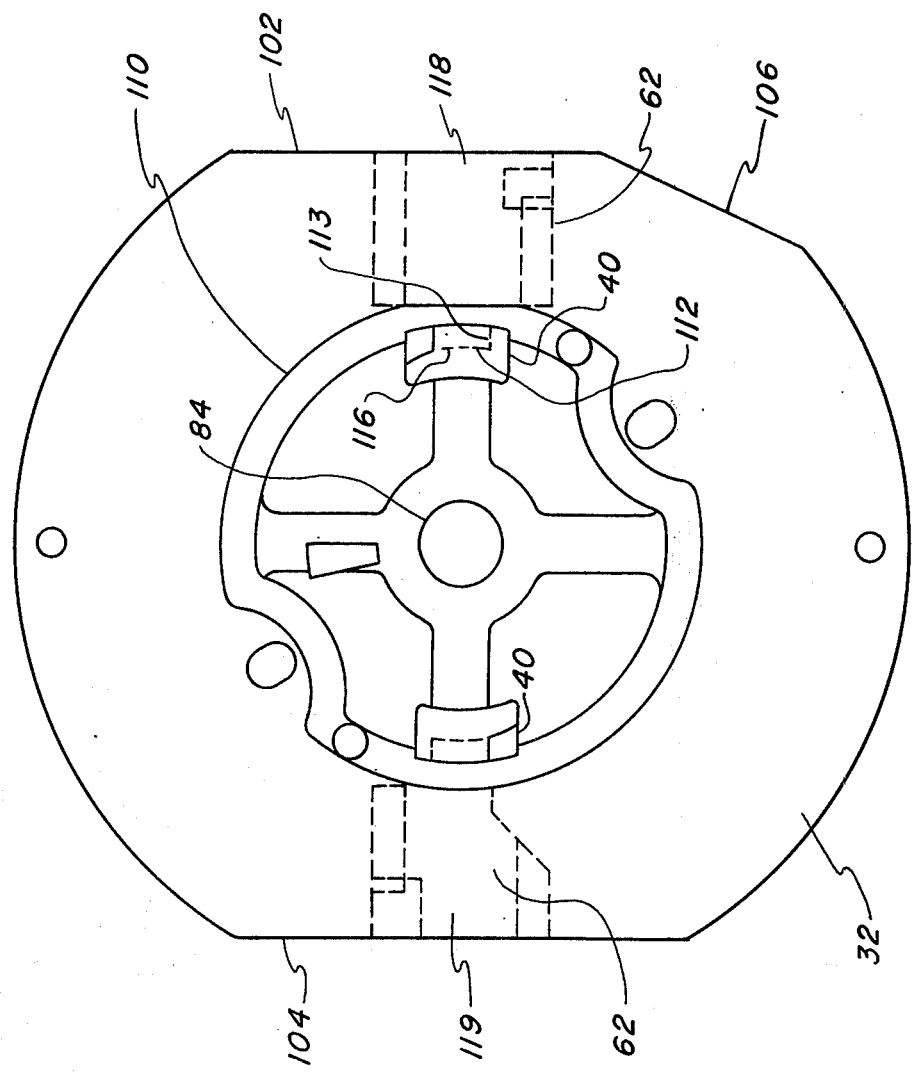
FIG. 5 is a view in elevation of the front face of the dial base of FIG. 3.

In the present dial base 12, two pillar members 40, one of which is shown in FIG. 1 and shown in greater detail in FIGS. 4 and 5, are molded to upstand from the dial base. These pillar members are integral portions of the plastic dial base and extend axially to a height above the indicia plate at a position radially inwardly of the indicia plate. In an assembled dial (as shown in FIG. 1), these pillars receive and hold a retaining ring 42 of novel design to join the indicia plate to the dial base, as will be explained later herein.

The rear surface 44 of the dial base has secured thereon the dust cover 16 which may be clear plastic. The dust cover protects the operative gears and springs of the dial from dust and other contaminants and from inadvertent handling. The clear nature of the cover renders the operative components visible when the dial is free of the housing. A plurality of flat spring terminals 48 are shown in FIG. 2 protruding from the cover for connection to suitable lead wires (not shown) as is well-known in the art. The dust cover rests on a raised wall 46 integral to the dial base which conforms in shape to the shape of the periphery of the dust cover. Extending outboardly from the wall 46 in the completed assembly are snap-in dial mounting brackets 50 and 52.

These dial brackets 50 and 52 are basically L-shaped sheet metal members with one leg 60 mating with a suitable pocket 62 (FIG. 4) in the dial base to extend essentially radially inwardly, the other leg 64 of the dial bracket extending axially to secure the dial base within a suitable dial housing. The leg 64 has an open inset 66 in its free end to receive a mounting screw, not shown. The dial mounting shown allows the dial shown to be interchangeable for dial mounting purposes with the dial shown in U.S. Pat. No. 2,988,631 of 6/13/61 to H. Hershey. In that patent, a dial is shown with brackets extending in an axial direction adjacent the dial periphery for mounting purposes.

One of the brackets, bracket 52 on its axial leg 64 has an angled receiver 70 for receiving the inward end of finger stop 22. This extension 70 is integral with leg 64 and bent therefrom, as will be explained.

In prior art dial bases made of sheet steel material, a similarly shaped finger stop receiver was provided. The receiver 70 was molded as part of the dial base to receive and hold the finger stop. One such form of finger stop mounting is shown in U.S. Pat. No. 2,963,554 issued 12/6/60 to Hershey.

In the manner described generally, the plastic dial base 12 receives brackets 50 and 52 in a snap-fit (as will be explained) providing means for assembling the dial base into a housing and for receiving the finger stop. The dial base also includes a retaining ring receiver for firmly locking the indicia plate to the dial base in a simple fashion.

In FIGS. 3, 4 and 5 we show in detail a dial base 12 as used herein. The dial base is essentially disc-shaped and fabricated by molding or the like of a suitable high impact plastic. In FIG. 3, the rear face 44 of the base is shown with a raised wall 46 to support the dust cover about the operative mechanism (not shown) suitably secured to the bosses 80 and openings 82. Central opening 84 is adapted to receive the main shaft of the operative mechanism to provide a rotatable connection between the finger wheel 14 and the operative mechanism within the dust cover 16 in any known manner. A plurality of depressions 86 in one end of the raised wall 46 receive flat leaf springs 48 (shown only in FIG. 2) to produce the output series of pulses as is known.

In FIG. 4, there can be seen the base 12 in profile with a raised wall 46, the wall having one height for most of its extent and being raised in the area along one notched surface, the notches 86 being provided for the contact spring terminals. Various mounting bosses 80 are provided for securing the dust cover 16 to the base in any known fashion. Below the level of sidewall 46, a low height wall 92 is provided about the base periphery.

It should be noted relative to FIG. 3 that the side of the dial base has parallel walls 102 and 104 in the area of the mounting bracket slots or pockets 62. Angled from wall 102 is an angularly disposed wall 106.

In FIGS. 4 and 5, there can be seen the front face of the base 12 with two diametrically opposed pillar members 40 raised above an integral collar 110 of the base (FIG. 5). Each pillar member 40 has a lateral recess 112 (shown dotted in FIG. 5) which extends into the pillar body and terminates in an end wall 113. The recess has an inner radial wall 116 which is concentric about the central opening 84 of the base.

As shown in FIG. 3 in the broken area and in dotted form in FIG. 5, there are provided two opposed transverse slots 118 and 119 in the parallel walls 102 and 104, each of the slots comprising a bracket-receiving pocket 62. The slot 119 in long wall 104 has one of its interior surfaces angled to provide a shape distinct from that of rectangular slot 118 in the shorter parallel wall 102. By providing slots of like width and depth but with internal surfaces of different shape, no error can be made in assembly by placing a bracket in the wrong slot. An axially directed window 121 and 123 provides communication from each slot 118 and 119 respectively as will be described.

In FIGS. 6–8, I show one bracket 50 which mounts in slot 119. This bracket is L-shaped, formed of strip steel of approximately 0.222 inch thickness, with leg 60 designed to enter slot 119 and be gripped therein. Leg 60 has one angled leading edge 124 to enter sot 119, first. Leg 60 has an interior oval opening 126 which defines one side of slitted tab 128 angled from the plane of the entry leg 60. This tab provides a snap-in gripping member to mate with the window 123 of slot 119. The height of this tab is normally greater than the height of the shallow receiving slot to an extent which allows the tab to be depressed prior to its entry into the window of the slot and prevent ready withdrawal of the bracket. A raised disc portion 132 is formed on leg 60 at the side opposite the tab to allow the leg 60 to enter the slot and be held relatively flat therein. Absent the level compensating effect of the raised disc, the bracket would rest in the slot at an angle determined by the tab height.

The other leg 130 of the bracket 50 is rectangularly disposed from leg 60 such that when the bracket 50 is assembled to the dial base, leg 130 is essentially parallel to wall 104. The leg 130 has an inset 66 in its free end to receive a mounting screw and has aligning holes 134 to aid in the mounting. Alternatively, a coined circular screw receiving hole may be provided in place of inset 66.

The other bracket 52 (FIGS. 9–11) serves two functions. In addition to its providing mounting for the dial base relative to its housing, bracket 52 acts as a finger stop receiver. Bracket 52 has an entry leg 142 generally similar to that of leg 124 of bracket 50. Leg 142 is essentially rectangular, has an angled tab 144 designed to enter window 121 and also has a swaged disc 146 similar in shape and function to those described previously. The mounting leg 150 is similar to that previously described; however, this leg has extending from it a formed section 70 seen best in FIGS. 9 and 10. Section 70 has a coined hole 162 through it for receiving a finger stop locking screw (See FIG. 2). Section 70 is angled from leg 150 to form an angle generally like the angle between dial base walls 102 and 106 (FIG. 3) with section 70 extending in a plane essentially parallel to the plane of leg 150. One edge of section 70 is turned up or formed over at a right angle to provide a guide wall 164 for the finger stop. The opposed edge of section 160 has an angled tab 166 which further acts as a guide and positioning member for holding a finger stop of known design.

With the bracket 52 assembled by snap-fitting into the slot in the dial base, leg 150 and section 70 extend downwardly from the base rear surface 44 along the walls 102 and 106. In this way, the dial can be readily assembled onto a housing base of the type shown in FIG. 15.

FIGS. 12–14 show the details of a retaining ring 42. The ring is made of strip carbon steel to have spring qualities. The ring is crowned as viewed in FIGS. 13 and 14 to enhance its spring characteristics. Its inner periphery has lock segments 172 integrally formed from the ring. These segments have their radially inner surface 174 formed on the radius of a circle whose center 176 is eccentric to the center of the ring. The radius of the segments is considerably smaller than the radius of the inner periphery 180 of the ring. One edge of each segment is slitted along line 182 on the inner periphery 180 to form opposed end-locking lugs 184. The lugs are deflected from the plane of the segments to provide a holding engagement between the ring 42 and the dial base pillars 40, capturing the dial number plate between the ring and front face.

Figure 15:
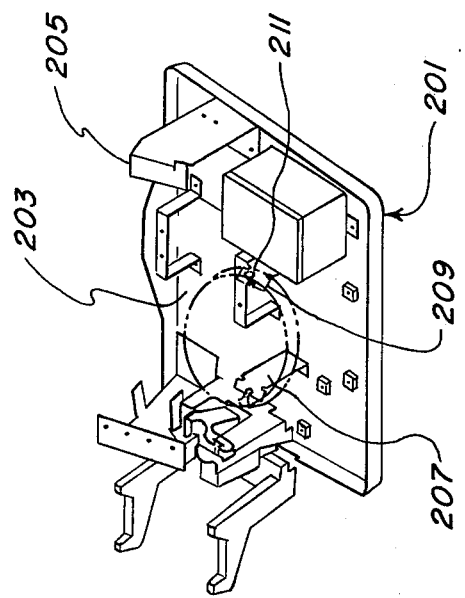
FIG. 15 is a schematic perspective view of the housing base of one type of phone instrument in which the dial may be mounted.

In FIG. 15, I show the interior of one type of telephone instrument to which the dial may be mounted. The instrument shown is of the multiple-line type telephone instruments which is well-known in the art. The instrument 201 has a flat metal base 203 with brackets 205 for holding an enclosing cover, ringer and other members. Rigidly connected to and upstanding from the base are two spaced apart brackets 207 and 209 for receiving the dial. These brackets receive a screw 211 within a coined or threaded opening adjacent their upper end for receiving the dial mounting bracket slots 50 and 52 between the screw heads and the base brackets for tightening of the mounting of the dial to the instrument base.

Turning now to the details of the joining of the indicia or number plate to the dial base, in FIG. 1 I show a typical indicia plate 30 which has an opening slightly larger than the outer circumference of the collar 110 of the dial base. The front face 32 of the dial base is essentially flat inboard of the collar 110 (FIG. 4) as is the underside of the indicia plate. Thus, the indicia plate may rest on the front face and generally positioned relative to the collar 110.

In assembly, retaining ring 42 is placed above the collar. The body of the ring overlies and rests on the inner circumference of the indicia wheel. The ring is rotated so that its tab segments enter the pillar recesses 112. Due to the slope of the inner periphery of the ring inner tabs 184 being steeper than that of the recesses, the tabs ride tightly across the recess edge and ride more loosely over the pillar inner edge toward the center of the tab segment. Both tab segments being opposite one another as are the pillars, the tab segments enter the recesses tightly. At the center of the tab segments, the engagement of the segment inner surface and pillar recess wall is loosened perceptibly. This slight loosening provides perceptible notice that the ring is properly in place. The angled nature of the tabs produce locking lugs which tend to grip the pillar recess undersurface and lock the connection of the indicia plate to the dial base. This engagement does not interfere with the central shaft rotation of the dial by the finger wheel.

With the construction features shown, I can mount a dial to any type of housing base and can readily assemble a number plate to the dial base.

I claim:

1. A rotary telephone dial assembly comprising an essentially disc-shaped dial base with diametrically opposed wall surfaces, said base adapted for mounting on one face thereof a stationary indicia plate and a manually rotatable finger wheel and adapted to position on the opposite face thereof output mechanism responsive to rotation of said finger wheel, the invention comprising means for mounting said assembly within a telephone housing, said means comprising a pair of slots, there being an entrance to each slot in each of said surfaces with said slots being parallel to said opposed face, a first and a second L-shaped mounting bracket of sheet metal with one leg of each bracket adapted to enter one of said slots, a holding tab angled from said each leg to engage and grip the adjacent slot to prevent removal of said brackets from the respective slot, and the other leg of said bracket including means for securing said assembly in said telephone housing.

2. An assembly as claimed in claim 1, wherein said holding tab comprises an integral internal portion of said one leg displaced angularly from said one leg and in which each such slot has a window for receiving the holding tab to lock the tab in the slot.

3. An assembly as claimed in claim 1 wherein there are raised pillar members extending axially from said base, said stationary indicia plate having a central opening to allow said indicia plate to rest on said base, a retaining ring adapted to rest on said indicia plate above said base, and a plurality of arcuate extensions on the inner circumference of said ring, each such extension including a tab portion angled from the plane of said circumference, and recesses in exterior sidewalls of said pillars for receiving said extensions.

4. An assembly as claimed in claim 3, wherein each said angled tab portion is struck out from a planar portion of the extension to grip the pillar recess.

5. An assembly as claimed in claim 4, wherein each extension includes an inner segmental surface of successively lesser radius than the distance in a radial direction from the center of said ring to one inner tip of said extension.

6. An assembly as claimed in claim 5 wherein each said pillar recesses terminates at an inner radial segmental shoulder of essentially the same radius as the radius of said extension segments.

7. An assembly as claimed in claim 6 wherein there are two diametrically opposed extensions on said ring.

8. A rotary telephone dial assembly comprising a mounting base structure, said base structure including means for mounting on one face thereof a stationary indicia plate and manually rotatable finger wheel, and means on the opposed face for mounting thereon output mechanism responsive to rotation of said finger wheel, the invention comprising: a tubular collar extending from said indicia plate adjacent the center thereof, and raised, yieldable pillar members extending from said base structure beyond said collar, a metal retaining ring adapted to rest on said collar, said ring outer periphery overlapping on the indicia plate, and a plurality of arcuate, concave extensions on the inner circumference of said ring, and recesses in an exterior sidewall of said pillars for receiving said extensions to mate said base plate and indicia, each said extension including a recess-entering edge and a trailing edge, with the trailing edge closer to the center of said ring than the leading edge.

9. An assembly as claimed in claim 8, wherein there are two such extensions opposedly facing one another, and each extension includes an inner concave surface, each said surface comprises a segment of a circle about a center eccentric to the center of said ring.

10. An assembly as claimed in claim 9 wherein said pillar recesses engage said extension surface in a compressive fit at the entering edge of said segments, and in a relaxed fit at the center of said segments to provide a full locking engagement of said ring to said pillars.

* * * * *